United States Patent

Pawlowski, Jr. et al.

[11] Patent Number: 5,812,168
[45] Date of Patent: Sep. 22, 1998

[54] AIR PURGING OF A PRESSURE REGULATED FREE-INK INK-JET PEN

[75] Inventors: Norman E. Pawlowski, Jr.; Ronald W. Hall, both of Corvallis, Oreg.

[73] Assignee: Hewlett-Packard Company, Palo Alto, Calif.

[21] Appl. No.: 630,698

[22] Filed: Apr. 12, 1996

Related U.S. Application Data

[63] Continuation-in-part of Ser. No. 518,847, Aug. 24, 1995, Pat. No. 5,736,992, which is a continuation-in-part of Ser. No. 331,453, Oct. 31, 1994, Pat. No. 5,583,545.

[51] Int. Cl.[6] .................................. B41J 2/19; B41J 2/175
[52] U.S. Cl. .............................................. 347/92; 347/85
[58] Field of Search ................................ 347/6, 85–87, 347/93, 94, 92, 7

[56] References Cited

U.S. PATENT DOCUMENTS

| | | | |
|---|---|---|---|
| 4,509,062 | 4/1985 | Low et al. | 347/87 |
| 4,677,447 | 6/1987 | Nielsen | 347/87 |
| 4,940,997 | 7/1990 | Hamlin et al. | 347/87 |
| 4,992,802 | 2/1991 | Dion et al. | 347/87 |
| 5,079,570 | 1/1992 | Hohr et al. | 347/7 |
| 5,325,119 | 6/1994 | Fong | 347/86 |
| 5,457,485 | 10/1995 | Moriyama et al. | 347/92 |
| 5,500,657 | 3/1996 | Yauchi et al. | 347/9 |
| 5,650,811 | 7/1997 | Seccombe et al. | 347/85 |

FOREIGN PATENT DOCUMENTS

| | | | |
|---|---|---|---|
| 0383558 | 2/1990 | European Pat. Off. | B41J 2/17 |
| WO 88/08515 | 11/1988 | WIPO | G01D 15/16 |

*Primary Examiner*—Joseph W. Hartary
*Assistant Examiner*—Craig A. Hallacher

[57] ABSTRACT

The present invention relates to free-ink type ink-jet pens and, more particularly, to a method and apparatus for purging air from an on-axis ink accumulator. A biased regulator mechanism is provided within the pen to allow ink from a pressurized ink reservoir to be fed to the pen while maintaining a predetermined set point back-pressure at the printhead as needed for appropriate pen operation. A mechanism in communication with the ambient atmosphere is used in conjunction with a substantially constant force biasing mechanism to maintain the balance between the countervailing forces. Back-pressure is maintained substantially constant regardless of the ink flow rate from the ink reservoir into the accumulator. By application of a positive pressure to the ambient atmosphere mechanism, the biased regulator mechanism is forced open and any gas bubbles trapped within the accumulator is forced out through the reservoir ink feed.

20 Claims, 12 Drawing Sheets

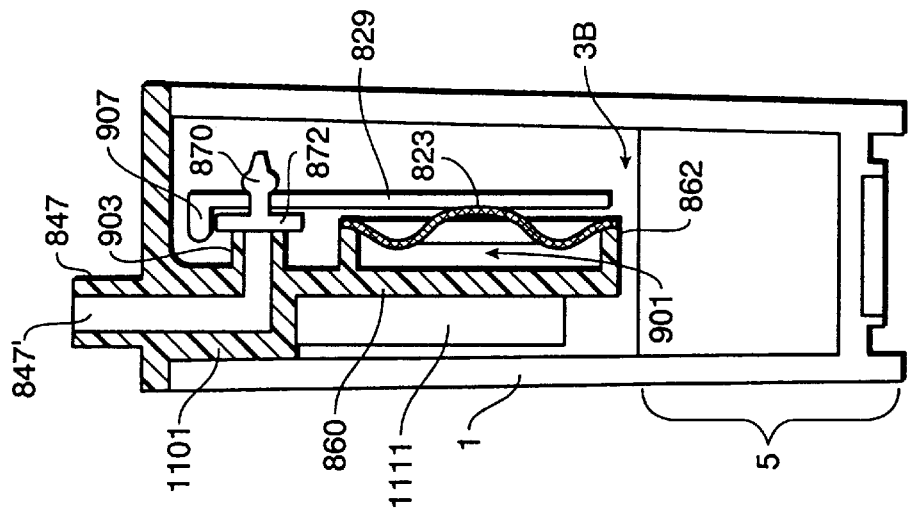
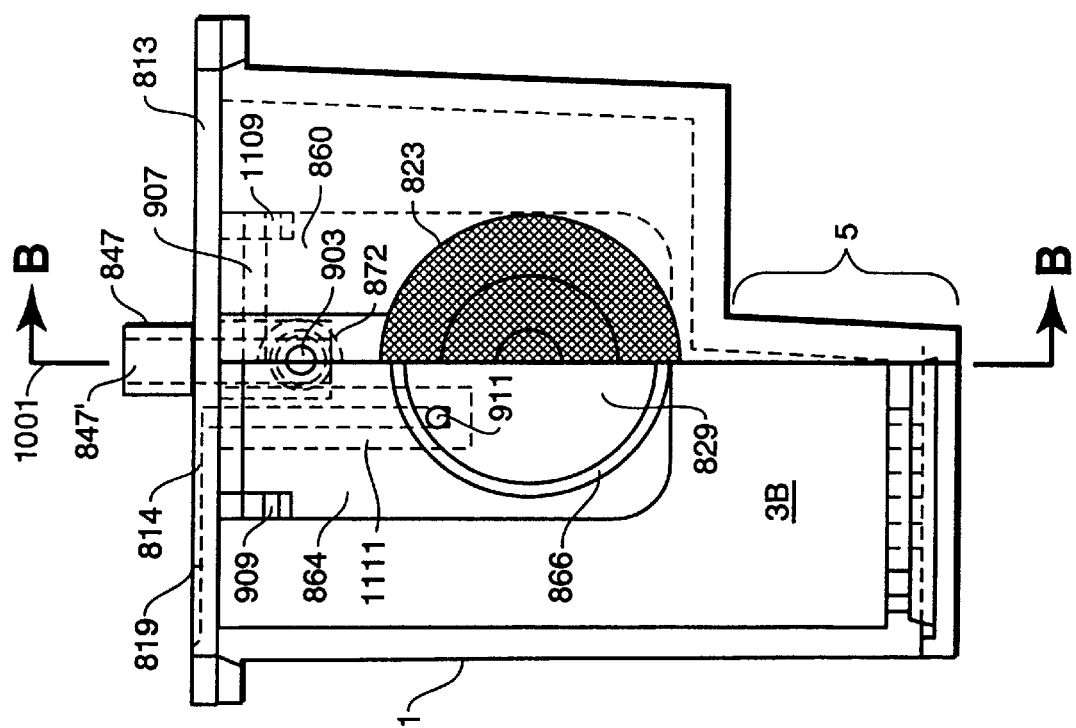
FIG. 10B
FIG. 10A

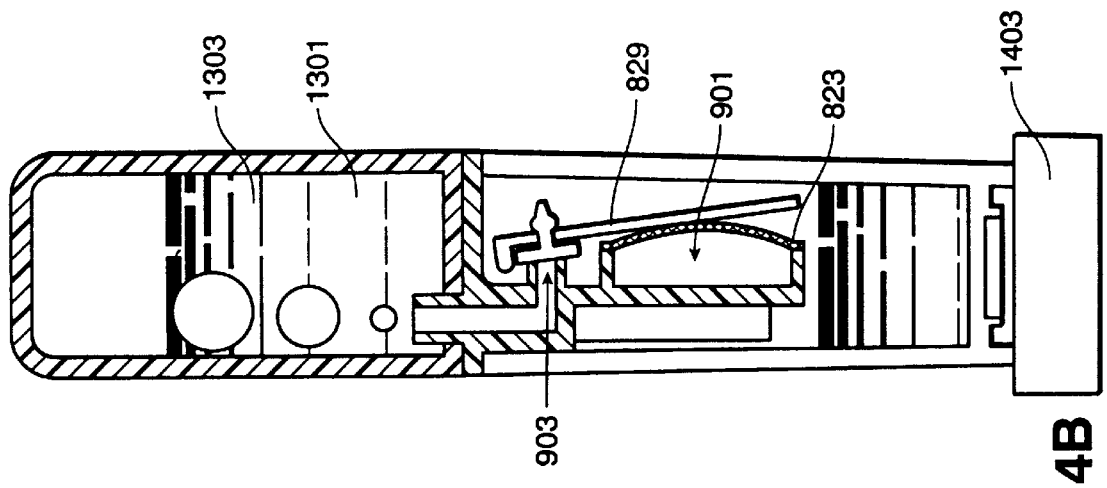
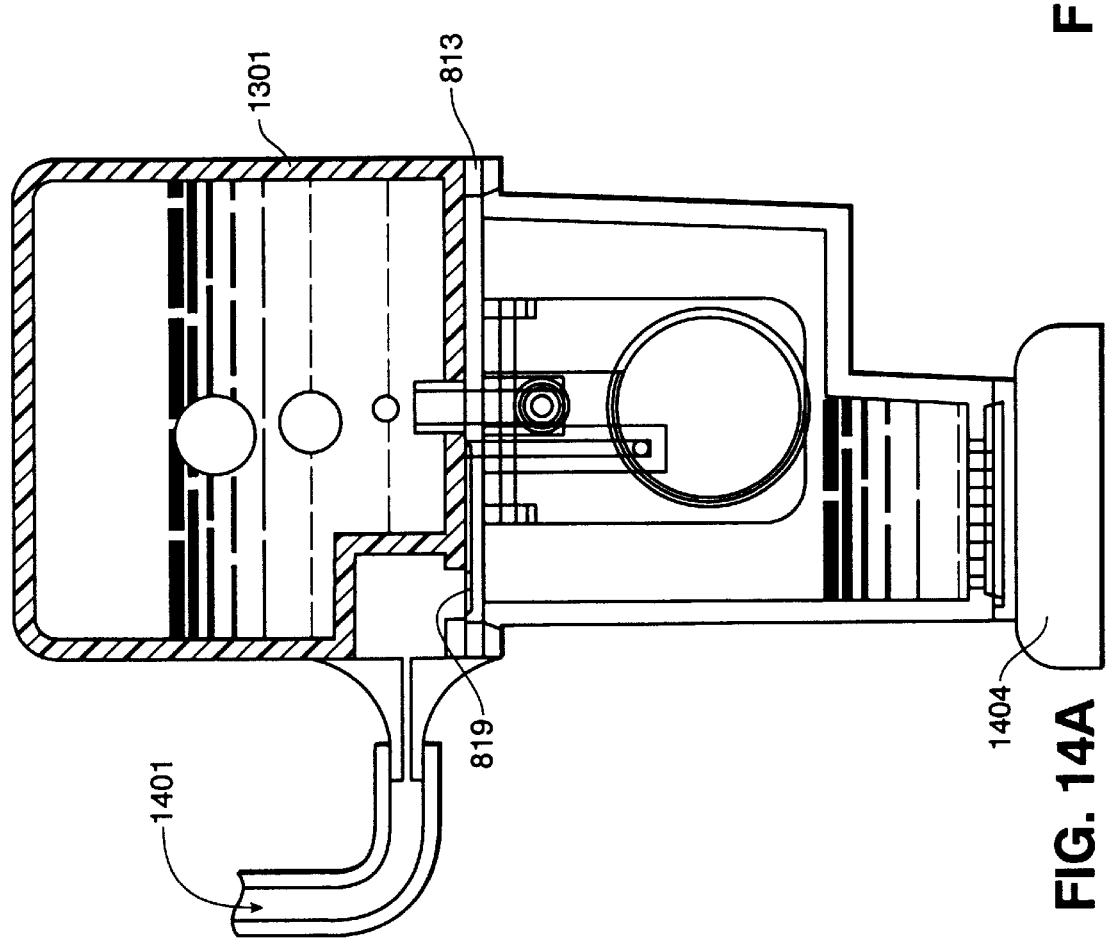

AIR PURGING OF A PRESSURE REGULATED FREE-INK INK-JET PEN

RELATED APPLICATIONS

This application is a continuation-in-part of U.S. patent application Ser. No. 08/518847, filed on Aug. 24, 1995, now U.S. Pat. No. 5,736,992, which is a continuation-in-part of U.S. patent application Ser. No. 08/331453, filed on Oct. 31, 1994, by Pawlowski et al., now U.S. Pat. No. 5,583,545, issued Dec. 10, 1996.

This application is related to U.S. patent application Ser. No. 08/065,957, filed on May 21, 1993 by Seccombe et al., assigned to the common assignee of the present invention, titled INK PRESSURE REGULATOR FOR INK JET PRINTHEADS, and its continuation-in-part U.S. patent application Ser. No. 08/409255, filed Mar. 23, 1995, now U.S. Pat. No. 5,650,811 each of which is incorporated herein by reference in its entirety.

BACKGROUND OF THE INVENTION

1. Field of the Invention

The present invention relates generally to ink-jet technology, more particularly to free-ink reservoir type ink-jet pens, and specifically to air purging of pressure regulated, free-ink, ink-jet pens.

2. Description of the Related Art

The art of ink-jet technology is relatively well developed. Commercial products such as computer printers, graphics plotters, and facsimile machines employ ink-jet technology for producing hard copy. The basics of this technology are disclosed, for example, in various articles in the Hewlett-Packard Journal, Vol. 36, No. 5 (May 1985), Vol. 39, No. 4 (August 1988), Vol. 39, No. 5 (October 1988), Vol. 43, No. 4 (August 1992), Vol. 43, No. 6 (December 1992) and Vol. 45, No. 1 (February 1994) editions, incorporated herein by reference. Ink-jet devices are also described by W. J. Lloyd and H. T. Taub in Output Hardcopy [sic] Devices, chapter 13 (Ed. R. C. Durbeck and S. Sherr, Academic Press, San Diego, 1988).

Generally, in the thermal ink-jet field, an ink-jet pen is provided with a printhead, having an orifice plate constructed in combination with heating elements.

Thermal excitation of ink near nozzles at the orifice plate is used to eject ink droplets through the miniature nozzles and orifices onto a print medium, forming alphanumeric characters or images using dot matrix manipulation. Other types of ink droplet generators, such as the use of piezoelectric transducers, are also known in the art.

The pen itself may have a self-contained reservoir for storing ink and providing appropriate amounts of ink to the printhead during a printing cycle. These self-contained, disposable pens are referred to in the art as print cartridges. Ink can be stored in a print cartridge in a contained medium, such as a permeable foam material (see e.g., U.S. Pat. No. 4,771,295 (Baker et al.), assigned to the common assignee of the present invention and incorporated herein by reference). Alternatively, the pen can be a free-ink type print cartridge, where the ink is supplied to the printhead mechanism from a self-contained reservoir such as a biased ink bladder or bag as shown in U.S. Pat. No. 5,359,353 ((Hunt et al.) assigned to the common assignee of the present invention and incorporated herein by reference). If a refillable type pen rather than a print cartridge is employed in the hard copy apparatus, ink is generally supplied from a remote, refillable, off-board, ink reservoir to a relatively permanent pen body and printhead mechanism. Early ink-jet printers used off-pen reservoirs as demonstrated in U.S. Pat. No. 4,312,007 ((Winfield) assigned to the common assignee of the present invention and incorporated herein by reference). Moreover, it has been found that for some hard copy applications, such as large format plotting of engineering drawings and the like, there is a requirement for the use of much larger volumes of ink than can be contained within a replaceable print cartridge. Therefore, improved, relatively large, off-pen ink reservoir systems have also been developed more recently. As examples, refer to U.S. Pat. No. 4,831,389 (Chan) which shows a multicolor off-board ink supply system; U.S. Pat. No. 4,929,963 (Balazar) which demonstrates an ink delivery system for an ink-jet printer using a low pressure recirculating pumping system; and U.S. Pat. No. 4,968,998 (Allen) which teaches an ink-jet pen which is refillable at a service station (each assigned to the common assignee of the present invention and incorporated herein by reference).

Moreover, an ink-jet pen can be designed to have a substantially permanent printhead mechanism and an on-board (also referred to in the art as on-axis), detachable, reservoir that can be refilled or replaced as needed.

While both print cartridges and free-ink ink-jet pens provide a reliable and efficient means of "jetting" droplets of ink from the printhead onto the print medium, the printheads generally require a mechanism to prevent the free flow of ink through the orifices when the printhead is not activated. Without such control, ink may leak, or "drool," onto the printing surface or into the printer mechanism. Such leaking ink may also build up and cake on the printhead itself, impairing proper operation. Complex pen service stations are often provided as part of the hard copy apparatus where printheads can be wiped or activated to "spit" away excess ink.

To alleviate this problem, many ink-jet printers supply ink from the reservoir to the printhead at a slight under pressure (also referred to in the art as "back-pressure" or "negative pressure" operation), lower than the ambient atmospheric pressure at the printhead. To be effective, this pen back-pressure must be maintained consistently and predictably within a desired operating range. That is, the pen back-pressure must be large enough to prevent the unwanted free flow of ink through the orifices when the pen is not in use, yet at the same time small enough so that the printhead, when activated, can overcome the back-pressure and eject ink droplets in a consistent and predictable manner. This back-pressure will be affected by changes in either or both the ambient atmospheric and the internal pressure conditions. Likewise, temperature variations may cause the ink and air within the ink-jet pen to contract or expand, also affecting the back-pressure. Therefore, these factors must be accounted for and a mechanism incorporated into an ink-jet pen design to maintain the back-pressure within the predetermined, desirable operating range.

In a foam reservoir print cartridge, the capillary action of the foam will generally be sufficient to create the desired back-pressure. In a free-ink reservoir type ink-jet pen, a variable volume, on-board, ink containment supply is often employed. For example, the reservoir may be of a biased, flexible material which can expand or contract, or an ink containment chamber may be provided which includes an internal pressure regulating device. In U.S. Pat. No. 4,509,602 (assigned to the common assignee of the present invention and incorporated herein by reference), a spring pulls an ink-filled bladder membrane outwardly to create a slight negative pressure inside the ink reservoir. U.S. Pat. No.

4,677,447 (assigned to the common assignee of the present invention and incorporated herein by reference) describes the use of a check valve in a printing device with an on-board ink reservoir that maintains a constant pressure difference between the ink reservoir and the ink-jet printhead. U.S. Pat. No. 4,992,802 (assigned to the common assignee of the present invention and incorporated herein by reference) teaches the use of two pressure control mechanisms to extend the environmental operating range of an ink-jet pen. Related U.S. patent application Ser. No. 08/065,957 (Seccombe et al.) describes a diaphragm type pressure regulator located on-board an ink-jet pen using an off-board ink reservoir. The ink reservoir is "pressurized" in that it is at atmospheric or a higher positive pressure; a variety of mechanisms for such pressurization are well known in the art.

Back-pressure needs to be controlled within a specified tolerance limits so that the printhead can print properly. Print quality fluctuations are directly related to back-pressure fluctuations. Too little back-pressure can lead to poor print quality and ink leakage; too much back-pressure can starve the printhead which will also affect print quality and printhead life since running an ink-jet pen dry can damage the printhead mechanism. The back-pressure needs to be maintained regardless of the printing conditions, but in the prior art has fluctuated as a function of ink level in the on-axis supply or as a function of the ink flow rate. Therefore, improvements to back-pressure mechanisms are needed to effectuate these contrary operational requirements.

A further problem in ink-jet pens is the entrapment of gas bubbles within the printhead or its on-axis ink accumulator chamber. Just as the volume of ink within the reservoir varies due to printing operation ink depletion, thermal or ambient pressure variations, and the like, so too the volume of the local ink accumulator thus varies. The back-pressure optimal operating range can be affected by the introduction of gases into a free-ink accumulator and if bubbles pass from the free-ink accumulator into the printhead. For example, air can be sucked up through the printhead orifice plate, outgassed from the ink composition, delivered from the remote ink supply, or may even diffuse in through the pen body material. As a biasing regulator mechanism is specifically designed to maintain the back-pressure in the printhead mechanism local ink accumulator chamber within a predetermined range, such unpredictable and thus unaccounted for gases may adversely affect operation. Furthermore, air may accumulate in such a quantity that it interferes with the fluidic coupling of the ink-jet nozzles to the ink accumulator. Therefore, these gases must be removed from a free-ink accumulator if the printhead and regulator mechanism does not have enough compliance to prevent the expanding gases from forcing ink out of the orifices during temperature and altitude excursions.

One such method for purging a pen is shown in U.S. patent application Ser. No. 08/519,384, filed by R. W. Hall on Aug. 25, 1995, and assigned to the common assignee of the present invention. A gas separation and purge mechanism is incorporated into a pen body construct having an on-axis ink containment chamber designed such that gases will rise toward the mechanism. A vacuum is cyclically applied to the gas separation and purge mechanism to remove the gas bubbles and to allow the ink containment chamber to refill from a remote reservoir as needed.

In a free-ink, ink-jet, pressure regulator pen such as taught herein, there is also a need for a gas purge and separator mechanism for the on-axis ink accumulator, regulator, and printhead mechanism.

SUMMARY OF THE INVENTION

In its basic aspects, the present invention provides an ink-jet pen apparatus adapted for use with an ink reservoir having a mechanism for supplying ink from the ink reservoir to the ink-jet pen apparatus at a predetermined feed pressure.

The present invention specifically provides for a method for purging bubbles from an ink-jet pen apparatus adapted for use with a separate ink reservoir coupled to supply ink from the ink reservoir to the ink-jet pen apparatus at a predetermined feed pressure, including the steps of:

providing an ink-jet pen body having an on-axis ink accumulator chamber, an ink-jet printhead mechanism hydraulically coupled to the chamber, and a regulator mechanism, mounted within the chamber, for regulating flow of ink into the chamber from the ink reservoir and for maintaining a predetermined, substantially constant, back-pressure set point at the ink-jet printhead;

coupling the ink containment chamber to the ink reservoir via the regulating mechanism;

filling the ink containment chamber with ink from the ink reservoir via the regulating mechanism; and after the step of filling the ink containment chamber, periodically forcing the regulating mechanism to an open flow position and flushing bubbles in the ink accumulator chamber into the ink reservoir.

Additionally, the present invention provides an ink-jet pen device for a hard copy apparatus including an ink reservoir for providing ink under pressure to the pen device via a hydraulic coupling and a mechanism for delivering print media to the pen device. This ink-jet pen device also includes a printhead mechanism for transferring droplets of ink to the print media during printing operation of the hard copy apparatus; an ink containing mechanism, having the printhead mechanism mounted thereon, for containing an on-board supply of ink for the printhead mechanism such that the printhead mechanism has a predetermined on-board volume of ink available; a regulating mechanism, enclosed within the ink containing mechanism, for regulating flow of ink from the ink reservoir mechanism into the ink containing mechanism and for maintaining a predetermined, substantially constant, back-pressure at the printhead mechanism during varying ink flow rates from the ink reservoir mechanism into the ink containing mechanism; and a purging mechanism for forcing the regulating mechanism to a position permitting flow of ink from the ink reservoir mechanism into the ink containing mechanism such that after the ink containing mechanism is filled gaseous bubbles within the ink containing mechanism are flushed from the on-board supply of ink via the hydraulic coupling.

It is an advantage of the present invention that the back-pressure regulator mechanism itself is used to purge bubbles from an ink accumulator chamber.

It is another advantage of the present invention that no mechanisms are added to a back-pressure regulator type ink-jet pen to accomplish the bubble purge functionality.

It is a further advantage of the present invention that manufacturability is simplified in that no addition piece parts are required.

It is yet a further advantage of the present invention that the methodology of purging bubbles from the accumulator can also serve to prime the printhead nozzles, that is, remove small inclusions of air by forcing ink passed the nozzles while bubbles are being purged through an ink inlet.

It is still another advantage of the present invention that ink is not wasted by expelling ink into the printer during a purge cycle; all ink is recycled.

It is another advantage of the present invention that there is substantially no probability of ink contacting printer components that are associated with the gas purging process.

Other objects, features and advantages of the present invention will become apparent upon consideration of the following detailed description and the accompanying drawings, in which like reference designations represent like features throughout the various depictions.

DESCRIPTION OF THE DRAWINGS

FIG. 6A is a detail of FIG. 6.

FIGS. 10A and 10B are elevation views of the present invention as shown in FIG. 9 in which:

FIG. 10A is a side view in a partial cutaway depiction, and

FIG. 10B is a view taken in plane B—B, arrow 1001, of FIG. 10A.

FIGS. 14A and 14B are another depiction of the present invention as shown in FIGS. 8 through 12 in which a during purging condition in accordance the present invention is demonstrated.

The drawings referred to in this description should be understood as not being drawn to scale except if specifically noted.

DETAILED DESCRIPTION OF THE INVENTION

Reference is made now in detail to specific embodiments of the present invention, which illustrates the best mode presently contemplated by the inventor for practicing the invention. While the present invention is described in terms of exemplary ink-jet pen structures, it will be recognized by a person skilled in the art that the invention is readily adaptable to other replenishable ink pens and, in fact, many fluid pressure regulating mechanisms. Therefore, no limitation is intended by the exemplary embodiments described nor should any be implied.

Figure 1:
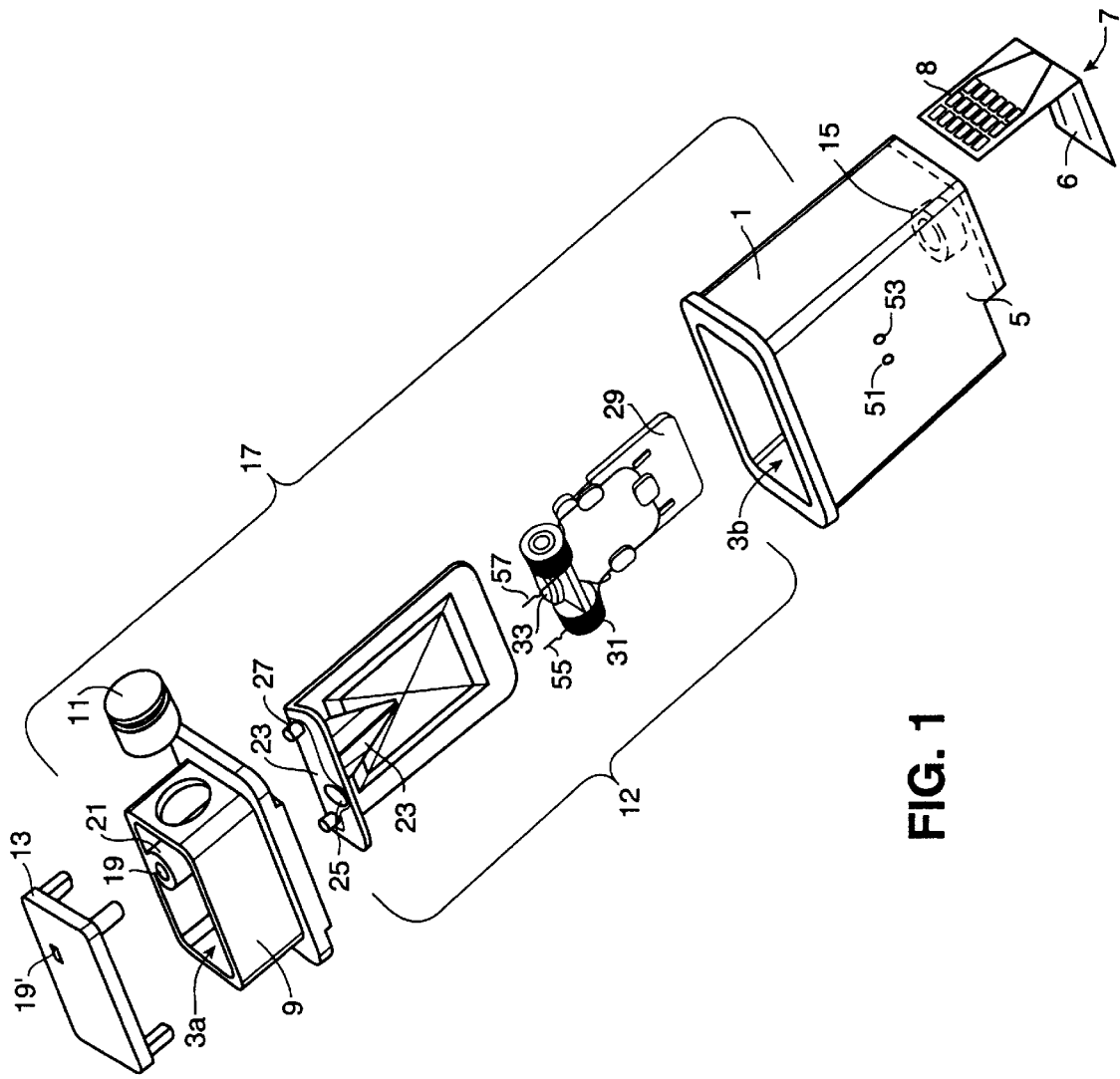
FIG. 1 is an exploded, schematic, perspective drawing of a first embodiment of the present invention.

Referring now to FIG. 1, a pressure regulator device in accordance with the present invention is a valve lever adapted to regulate ink flow from a remote ink reservoir into a pen body by selectively opening and closing a valve based upon fluid pressure level within the pen body.

A pen body 1 is provided which includes a partitioned ink containment chamber 3a, 3b and a printhead snout portion 5 for a printhead mechanism 7. A printhead mechanism 7, generally having a nozzle plate 6 and flex circuit 8 is adapted for cooperative mounting on the snout portion 5. A pen body crown 9, which includes a portion of the ink containment chamber portion 3a, is adapted to cap the pen body 1. A septum member 11 of the pen body crown 9 provides a coupling mechanism for a remote, positive-pressure, ink reservoir (not shown) by any suitable means as would be known in the art. In combination with a crown lid 13, the ink containment chamber 3a, 3b is substantially fluid tight. That is, ink flows under pressure from the remote ink reservoir through the septum member 11 and into the containment chamber portion 3a. Ink in the containment chamber portion 3a flows into the pen body containment chamber portion 3b and snout portion 5, controlled via a pressure regulator valving mechanism 12. From the pen body containment chamber portion 3b, ink is supplied directly into the printhead mechanism 7 via an ink outlet tube member 15.

As shown in FIG. 1, an ambient atmosphere vent 19 is provided in the form of a crown tube 21 through the pen body crown 9 and continuing through the crown lid 13, as a lid vent 19'. During assembly, an inflatable bag member 23 (shown in a deflated condition) is fixed in its substantially deflated state to a fitment 25. The fitment 25 includes an apertured pipe 27 with the inflatable bag member 23 substantially sealed around the fitment 25 and the apertured pipe 27 such that when mated with the pen body crown 9, the apertured pipe 27 is aligned with the ambient atmosphere vent 19, 19' through the crown tube 21. In this manner, the bag member 23 interior is open to the ambient atmosphere but sealed against the ingress of ink that flows under pressure from the ink reservoir through the septum member 11 and into the containment chamber portion 3a and then through the valving mechanism 12 and into containment chamber portion 3b.

A pressure regulating valve actuating member 29 is mounted via a biasing spring 31 to the pen body crown 9. The spring-biased valve actuating member 29 acts as a lever and includes a valve seat 33 to regulate the flow of ink through the pen body containment chamber 3a, 3b, the valve opening and closing depending upon the use rate of the printhead mechanism 7 and subsequent pressure in containment chamber portion 3b. When assembled, the valve actuating member 29 is adjacent the inflatable bag member 23. Note that the spring 31 is a torsion spring that will exert a substantially constant spring force during deflections.

With the inflatable bag member 23 mounted adjacent the valve actuating member 29 and coupled to ambient atmospheric pressure via the vent 19, 19', the bag member 23 inflates and deflates in response to the differential between ambient atmospheric pressure and the pressure level within ink containment chamber portion 3b, the valve seat 33 opening and closing the valving mechanism 12, respectively.

In operation, the ink containment chamber portion 3b begins to run dry as printing continues via the printhead mechanism 7. As the depleting local supply of ink in the containment chamber portion 3b decreases, because the containment chamber portion 3b is sealed against the ambient atmosphere, a low pressure condition occurs. As the pressure drops within the containment chamber portion 3b, ambient air pressure via the ambient atmosphere vent 19, 19' inflates the bag member 23 based upon the increasing pressure differential. The bag member 23 in turn pushes on the valve actuating member 29, increasingly changing its relative position against the force of the spring 31 within the chamber portion 3b as the bag member 23 inflates.

In other words, the spring 31 pushes the valve seat 33 against a valve (such as a molded orifice, pipe, needle-valve, or the like, hidden in the view of FIG. 1) between the ink containment chamber portions 3a, 3b, shutting off the flow of ink. When the back-pressure at the ink-jet printhead mechanism 7 is less than the predetermined set point back-pressure, the inflating bag member 23 exerts a force on the valve actuating member 29, overcoming the spring force and causing it to act like a lever, moving the valve seat 33 such that ink can flow from the ink containment chamber portion 3a into the ink containment chamber portion 3b. The magnitude of the force exerted by the spring 31 will exceed the magnitude of the force exerted by the bag member 23, causing it to deflate when the back-pressure at the ink-jet printhead 7 is equal to or slightly exceeds the set point back-pressure. The valve actuating member 29 moves back under the force of the spring and the valve seat 33 shuts off the flow of ink.

Figure 7:
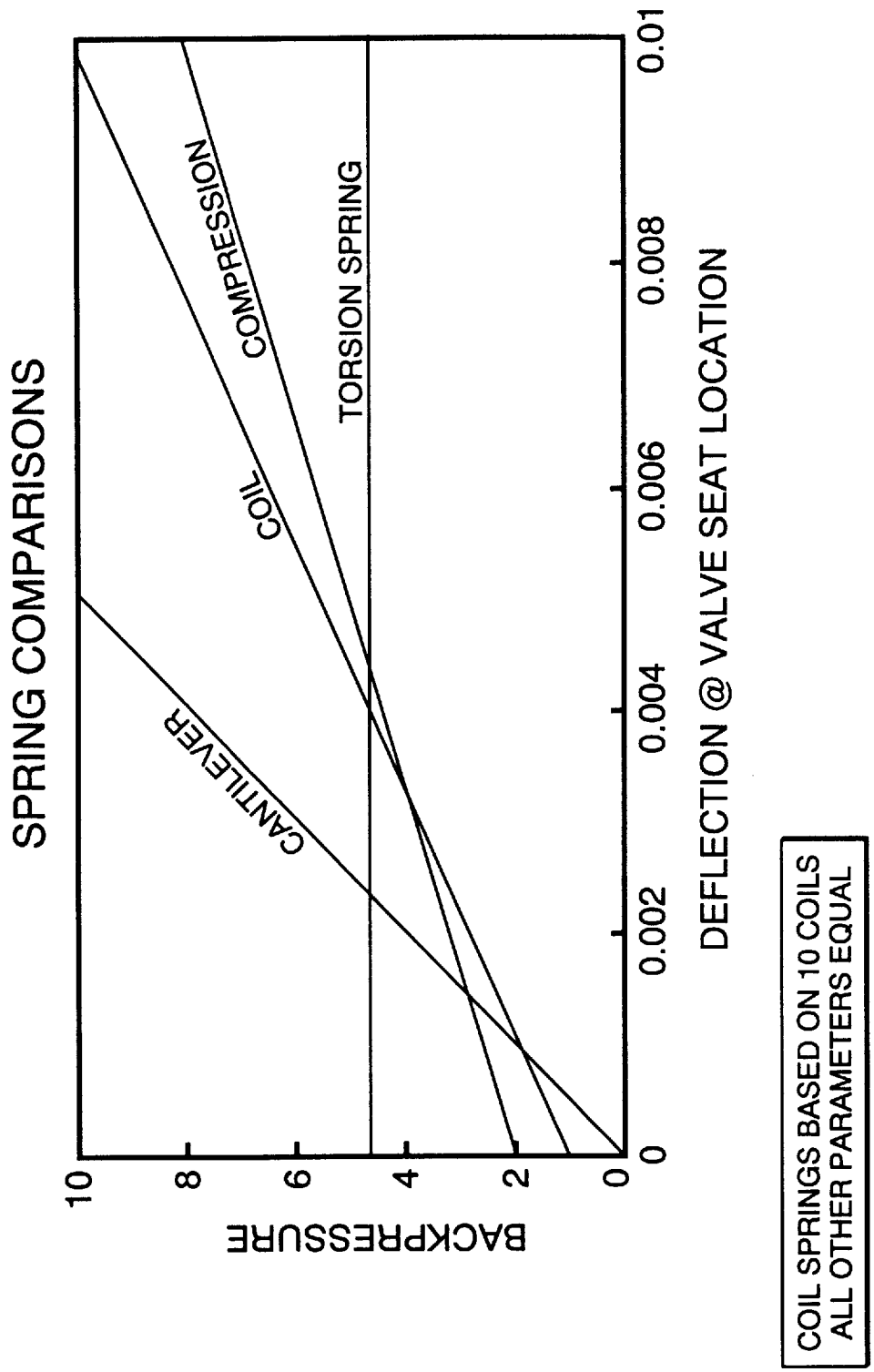
FIG. 7 is a graphical comparison of back-pressure versus spring deflection for different types of spring mechanisms available for use in the present invention.

The use of a torsional spring has distinct advantages over prior art pressure regulators such as of the type disclosed in U.S. patent application Ser. No. 08/065,957 (Seccombe et al.) which uses a cantilever spring. Back-pressure fluctuations can be related to change in spring force and is sensitive to the ink flow rate through the valving mechanism 12. The ink flow rate through the valve increases as print density increases. Ideally, a constant back-pressure should be maintained regardless of printing conditions or ink level conditions. This goal is difficult to achieve since a spring-based system is predicated on the relationship:

$$F=k*x,$$

where F is the spring force, k is the spring constant, and x is the amount the spring is deflected. Thus, to reduce the amount the spring force increases for any given deflection, x, the spring constant, k, would need to be reduced. To obtain an acceptable back-pressure set point, the spring must be preloaded accordingly. In the present invention, the spring constant is reduced by use of a torsion spring which provides a means for combining a relatively large number of active coils within a compact space. Preloading thus occurs in a radial direction. Thus, the mechanism is preloaded to a predetermined set point without occupying extra internal volume more efficiently used for ink storage. Referring briefly to FIG. 7, a comparison showing the substantial advantage in keeping a steady back-pressure using a torsion spring versus a cantilever, extension, or compression type spring in a spring-loaded regulator mechanism. While size might be a problem, a "negator" spring (e.g., as in a tape measure) also would provide a substantially constant spring force.

Referring back to FIG. 1, the valve actuating member 29 is also adapted to serve as an out-of-ink detector 17 in that when the ink supply runs dry and flow ceases through the septum 11 into the containment chamber 3a, 3b, the bag member 23 eventually fully inflates. A variety of electrical circuit devices can be integrated into the device to provide an indication that an out-of-ink condition has occurred when the valve actuating member 29 reaches a predetermined position within the in containment chamber portion 3b. For example, in the embodiment depicted in FIG. 1, if the valve actuating member 29 is constructed of metal, two electrical contacts 51, 53 of an open circuit associated with the flex circuit 8 of the printhead mechanism 7 can be provided through the wall of the pen body 1. Traces from the contacts 51, 53 to the flex circuit 8 can be provided in a suitable manner as would be known in the art. In operation, as the bag member 23 inflates, the valve actuating member 29 eventually bridges the contacts 51, 53 and closes the circuit. In other words, the valve actuating member 29 acts as a circuit breaker device. Alternatively, the ends 55, 57 of a metal spring 31 could similarly be used to close a circuit.

With the completion of the electrical circuit, an out-of-ink condition indicator (not shown), such as a lighted indicator, a tone producing device, or the like, can warn the user to replenish or replace the ink supply. Preferably, the contact is closed prior to complete starvation of the printhead so that the ink supply can be replenished prior to the pen reaching a de-primed condition.

Figure 2:
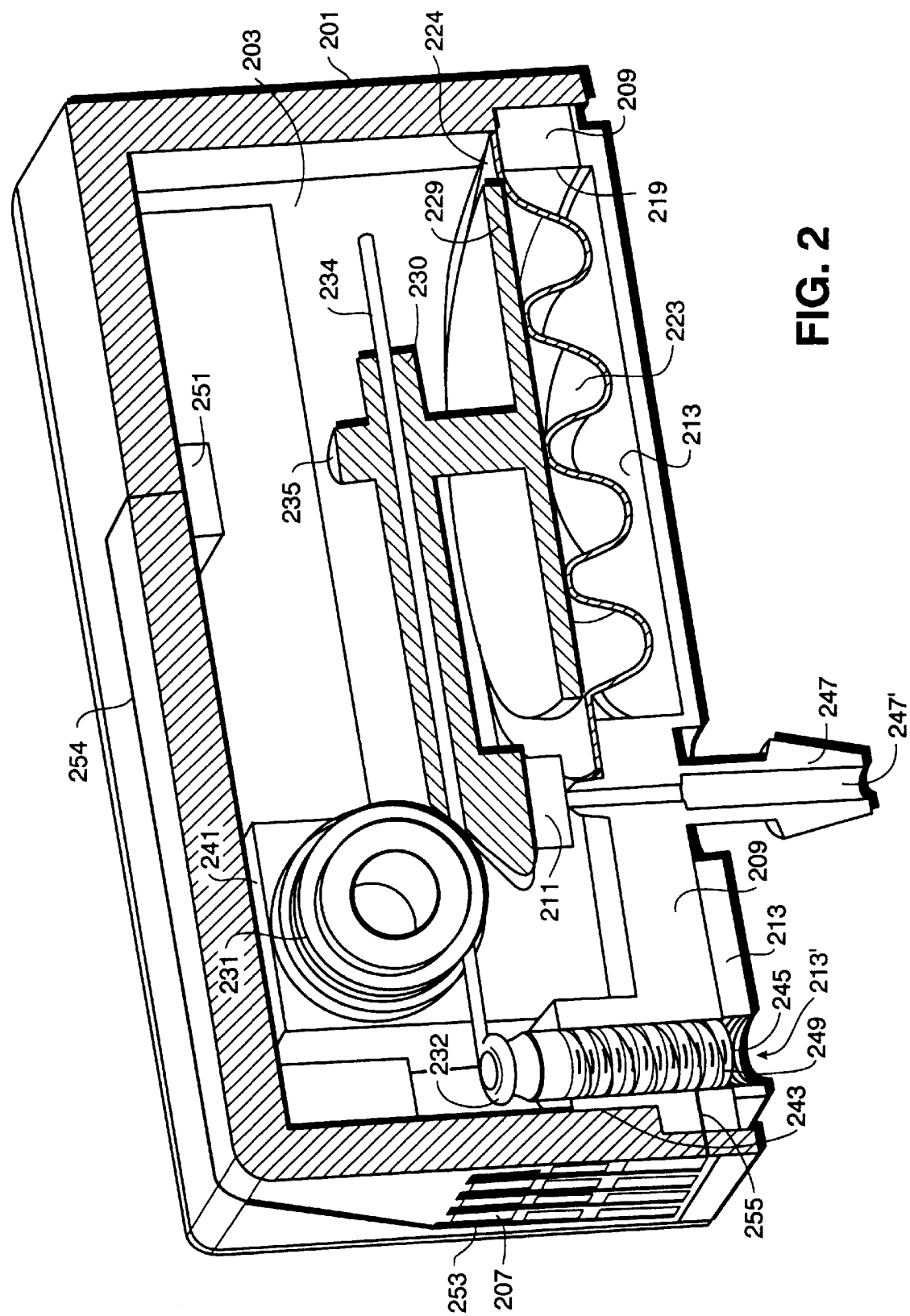
FIG. 2 is a schematic, perspective, cross-section drawing of a second embodiment of the present invention.
Figure 3:
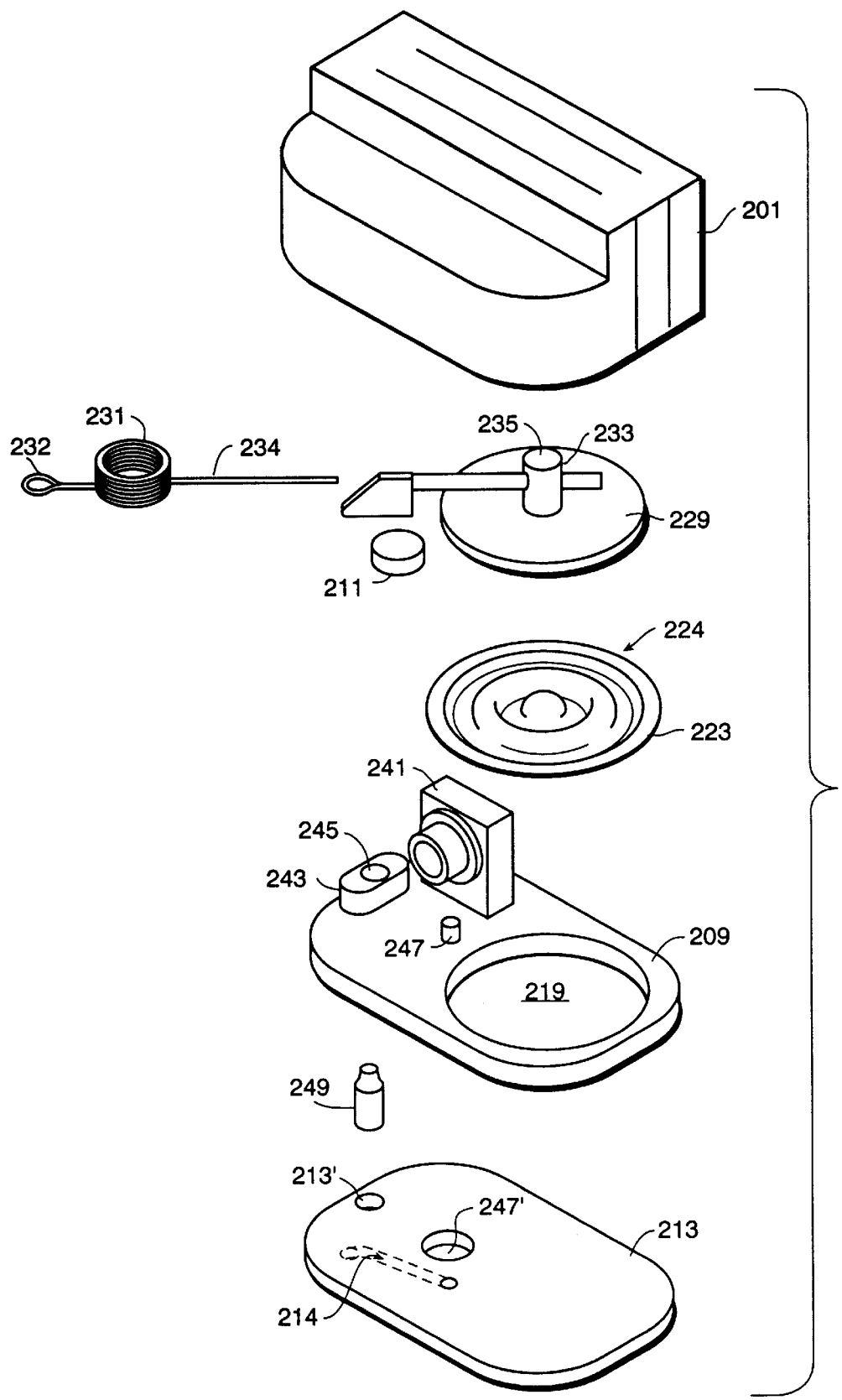
FIG. 3 is an exploded, schematic, perspective drawing of an embodiment of the present invention similar to that as shown in FIG. 2.

A first alternative embodiment is shown in two similar configurations in FIGS. 2 and 3. A pen body 201 includes an ink containment chamber 203. A printhead mechanism (not shown in this depiction, but see element 7, FIG. 1) is adapted for attachment, such as at flex circuit 207 or another suitable ink outlet position, as dictated by design expediencies as would be known to a person skilled in the art. A pen body base member 209 includes a spring mounting post portion 241, a spring tension adjustment screw seat portion 243 having a threaded bore 245 therethrough, and a hollow ink inlet tube member 247.

Within the containment chamber 203, a diaphragm 223 is mounted about its periphery 224 to substantially seal a complementary aperture 219 through the pen body base member 209. A vapor barrier lid 213, having an aperture 213' for access to a spring tension adjustment screw 249, completes a fluid-tight, pen body enclosure. The vapor barrier lid 213 is preferably vented by a long, relatively narrow channel 214 (FIG. 3 only) to reduce vapor loss while leaving the diaphragm 223 susceptible to ambient atmospheric pressure.

A near constant-force biasing mechanism, torsion spring 231, is mounted on the spring mounting post portion 241 of the pen body base member 209. The torsion spring 231 is adapted to have a first extremity 232 form a seat mated with the spring tension adjustment screw 249. The distal extremity 234 of the spring 231 is elongated and adapted to carry a plunger arm portion 230 connected to a plunger member 229 via an electrically conductive post member 235. The plunger arm portion 230 is further adapted to carry a valve seat 211 for mating with an ink inlet tube member 247, having a hollow bore 247' coupling to act as a conduit for ink from the remoter reservoir. In general, the valve mechanism can be a commercially obtainable needle and seat type and the valve can be actuated by any design expedient plunger arm assembly to which the seat is attached. The spring 231 exerts a force on the plunger arm portion 230 that equals the force exerted by the diaphragm 223 when the back-pressure equals the predetermined design back-pressure set point.

Figure 4:
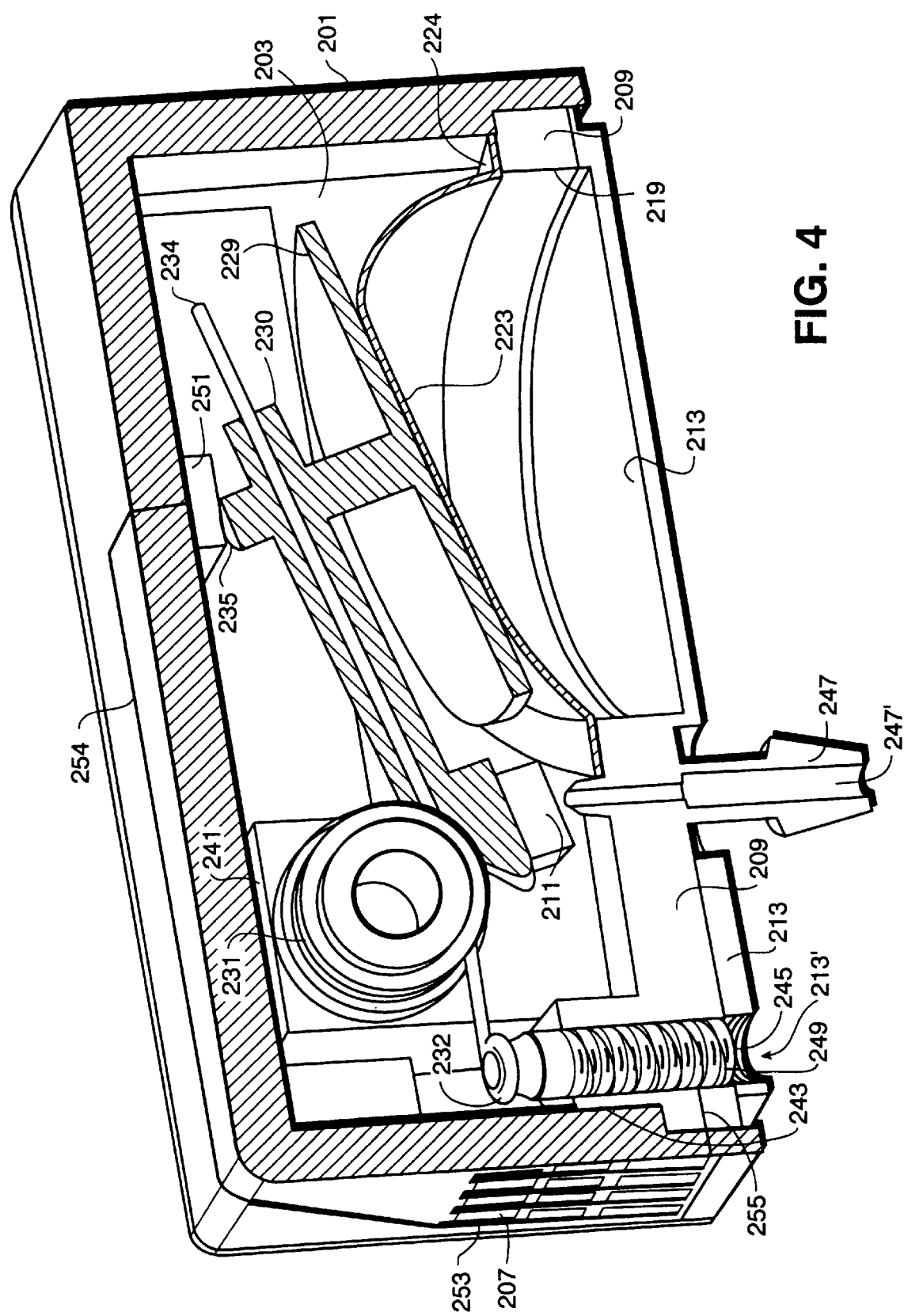
FIG. 4 is another depiction of the present invention as shown in FIG. 2 which demonstrates a valve and valve seat in a fully open position.

Operation of the embodiment of FIGS. 2 and 3 is shown in FIG. 4. Similarly to the operation of the embodiment shown in FIG. 1, when the ink supply is depleted, the pressure inside the containment chamber 203 will fall. As the chamber pressure falls below ambient atmospheric pressure, the diaphragm 223 is flexed into the chamber 203. This pressure differential opens and closes the valving mechanism which lets ink from a pressurized remote reservoir enter the pen and printhead mechanism via the conduit that is inlet tube bore 247'. Forces are balanced in this spring-loaded regulator embodiment using a diaphragm 223 and a torsional spring 231. The diaphragm 223 creates its force from the pressure differential between the pen's interior ink containment chamber 203 and the ambient atmosphere. The torsional spring 231 is designed to counter-act the diaphragm force to achieve an equilibrium balance providing an appropriate predetermined back-pressure for the pen and printhead design. This balance set point (depending on the specific pen design printhead architecture requirements) can be roughly set and then adjusted by turning a provided adjustment screw 249 which also acts as the spring stop. All of the pressure regulator components are substantially hermetically sealed within the pen body enclosure. Note that the enclosure also acts as a travel limiter for the spring 231 and plunger arm assembly 229, 230, 235. Thus, when the pressure regulator is subjected to large negative pressures, the enclosure prevents large deflections which could damage the mechanism. The addition of the vapor barrier lid 213 limits evaporation of ink solvents; the lid 213 can be formed of a commercial material, such as a brass foil, that is impermeable to vapor outgassed from the ink in the containment chamber 203.

Note also that the set point of the present embodiment can be adjusted once the device has been assembled using screw 249. This allows much tighter control over back-pressure and increases print quality and manufacturing yield.

Referring back to FIGS. 2 and 4, as with the embodiment of FIG. 1, the device can again be used as an out-of-ink-detection mechanism. Referring again to FIG. 2, an electrical contact 251 is suitably mounted within the containment chamber 203. An electrical trace 254 connects the contact 251 to circuitry 253. Similarly an electrical trace 255 connects the torsion spring 231 to the circuitry 253 via conductive screw 249. If the reservoir is out of ink such that there is no longer any flow through conduit bore 247', the diaphragm 223 will flex until the post member extremity 235 abuts the electrical contact 251 as shown in FIG. 4. In this manner, the combination of the post member extremity 235 and torsion spring 231 connected to the electrical circuitry 253 via trace 255 completes a circuit with the electrical contact 251 connected to the electrical circuitry 253 via trace 254. The completion of this circuit is used to trigger an out-of-ink condition as with the previous embodiment.

The same resolution can be had using the torsion spring design of the present invention with a relatively large lever arm to provide a cantilever action in a smaller footprint design. The torsion spring configuration gives the spring system a lower spring rate which allows greater movement of the valve seat. This also gives the system the potential for higher flow rates when needed, whereas actual cantilever spring type regulator systems do no have enough throw to provide the same leverage ratio to obtain similar flow rates.

As a general proposition, increasing the diaphragm area improves the performance of the regulator mechanism. To optimize performance, the size of the diaphragm should be maximized for any given pen body size. Several alternatives can be used to reduce the regulator mechanism footprint. The regulator mechanism diaphragm does not necessarily have to be round; effective area, not shape, is all that is needed in the force balancing equation of the pressure regulated pen system. Therefore, an oblong or oval or even square shaped diaphragm may be used. Such an embodiment shown in FIG. 5.

A pressure regulated pen body 501 (shown with a cover or side plate removed) has a local ink containment chamber 503. An appropriate printhead mechanism, such as shown in FIG. 1 is adapted for attachment as dictated by design expediencies for pen orientation with respect to the print medium platen (not shown). As in FIG. 2, a spring mounting post 541 (see also FIG. 2 element 241), a spring tension adjustment screw seat post 543 (see also 243, 245, 249), and a hollow, ink inlet tube member 547 (see also 247, 247') is provided. The ink inlet tube member 547 provides a channel for coupling the ink containment chamber 503 to a remote ink reservoir (not shown) such as with a simple tube or other ink conduit (not shown).

Within the ink containment chamber 503, an oblong diaphragm 523 (see also 223) is mounted about its periphery to substantially seal a complementary cavity in the pen body 501 (hidden in this view; see also 224, 219). A port 519 connects the cavity to the ambient atmosphere. The port 519 is preferably a relatively long, narrow channel or labyrinth in order to reduce vapor loss while leaving the diaphragm 523 susceptible to ambient atmospheric pressure changes.

A torsion spring 531 (see also 231) is mounted on the spring mounting post 541. The torsion spring 531 is mounted to have an extremity 232 proximate the spring coil and coupled to the spring tension adjustment screw seat post 543 and adjustment screw therein (not shown; but see FIG. 2, elements 232, 245, 249). A distal extension member 534 (see also 234) of the torsion spring 531 extends through a plunger arm member 530. The plunger arm member 230 is coupled to a plunger post member 535 (see also 235) which is in turn coupled to a plunger member 529 (see also 229). The plunger arm member 530 also bears a valve seat mount 530'.

The inner reach of the ink inlet tube member 547 has an opening, such as a molded orifice or the like, into the ink containment chamber 503 that acts in conjunction with the valve seat 533 and torsion spring assembly inside the chamber 503 to act as a valving mechanism.

Figure 5:
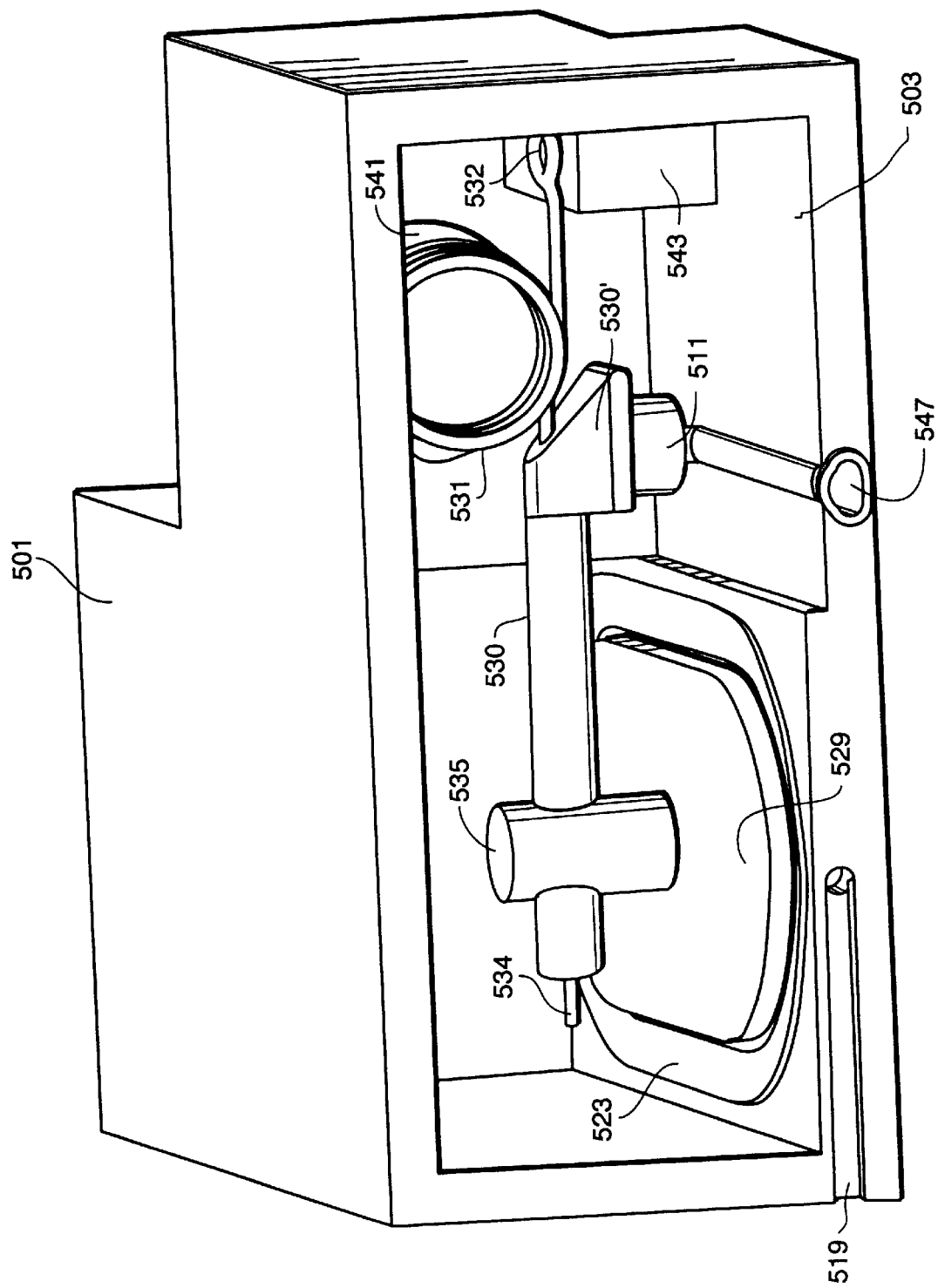
FIG. 5 is a schematic, perspective drawing of another embodiment of the present invention with a pen body cover plate removed.

The operation of the embodiment as shown in FIG. 5 is substantially the same as with the prior embodiment of FIGS. 2 through 4 as described above.

Figure 6:
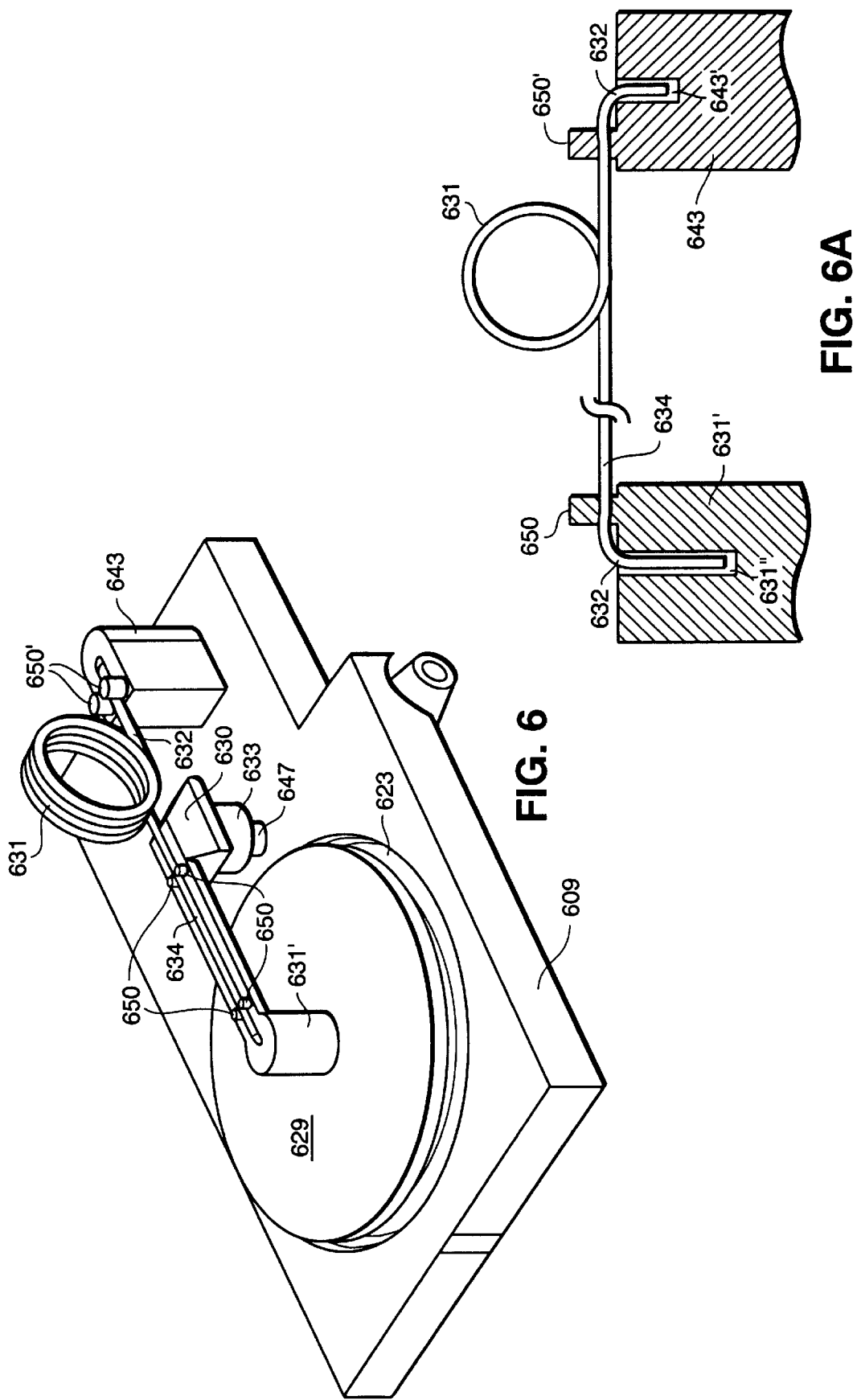
FIG. 6 is a schematic, perspective drawing showing a "frictionless" pivot mechanism employed as a component of the present invention.

Referring now to FIGS. 6 and 6A, it has been found that it is advantageous to make the diaphragm deflection mechanism as frictionless as possible. By doing so, variations in back-pressure are reduced and pen operation will be more consistent. A pen body base member 609 provides a similar mechanism for a diaphragm 623 and plunger 629 mechanism as in the embodiments shown in FIGS. 2 through 5. A plunger arm 630 is coupled to a free-floating torsion spring 631. A plunger post member 631' of the plunger arm 630 has a recess 631" (FIG. 6A) or other mechanism for fixedly capturing one extremity 632 of the spring 631. Snaps 650, or other holding mechanisms along the plunger arm 630, fixedly secure a plunger arm spring extension member 634 to the plunger arm 630. A valve seat 633 and inlet valve mechanism 647 are provided in a manner substantially identical to the prior embodiments as already described. An opposite spring extremity 632 is fixedly captured (or designed for adjustment as shown in the embodiments of FIGS. 2 through 5) in a recess 643' of a base member mount post 643 such as with snaps 650'.

Operation of the embodiment of FIGS. 6 and 6A is identical to the embodiment of FIGS. 2 through 5, only in this configuration where the spring is end mounted and the spring coil is free floating, frictional influences upon the diaphragm are minimized.

Note that in addition to maintaining the pen ink containment chamber in a proper back-pressure balance, the apparatus can be used to "prime" the printhead. By manually pushing the diaphragm, such as by forcing a pressure through the vent (see FIG. 4, element 214), the regulator valve could be held open and ink forced into the containment chamber until any air or gases from the ink is expelled through the orifice plate or a gas purge vent mechanism.

Referring now to FIGS. 8, 9, 11, and 12, an alternative embodiment of the present invention is depicted. A diaphragm-type regulator such as used in the embodiments of FIGS. 2–6, is used in a much simplified mechanism which is more closely related to the inflatable bag member 23 of the embodiment as shown in FIG. 1.

The pen body 1 has a snout portion 5 (shown without the printhead mechanism; see FIG. 1, elements 6–8), a pen body ink containment chamber 3A, and an ink accumulator chamber 3B. (Note that the present invention is not limited to a single ink accumulator chamber embodiment, but is readily adaptable to multi-chamber implementations such as taught in U.S. patent application Ser. No. 08/611,111 by Pawlowski, Jr. et al., assigned to the common assignee of the present invention and incorporated herein by reference).

Figure 9:
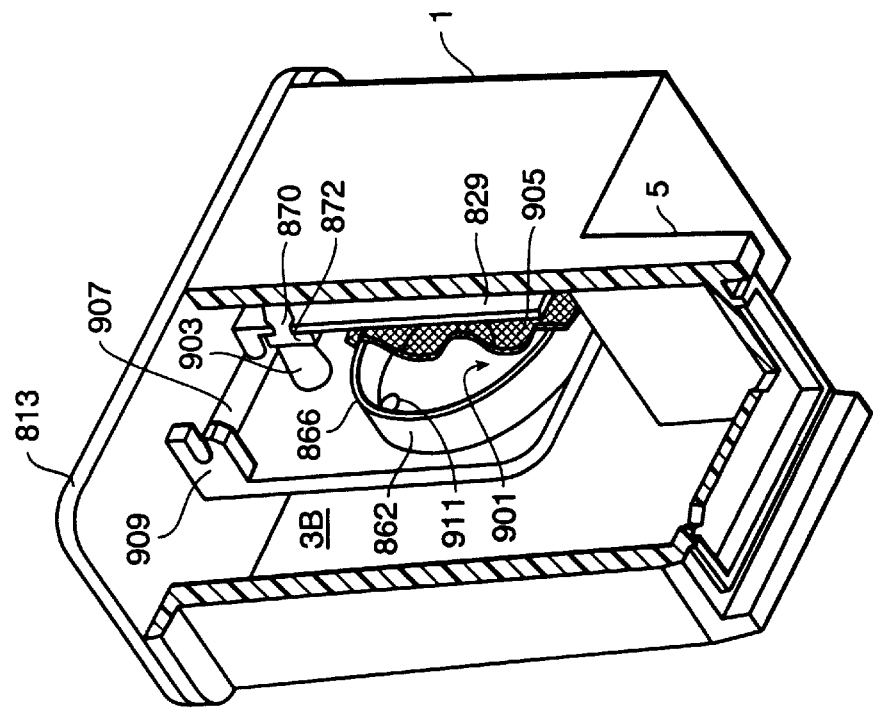
FIG. 9 is a partial cutaway, perspective view of the assembled mechanism of present invention as shown in FIG. 8.

A pen lid 813 has a depending, substantially planar, regulator mount 860 which inserts into the ink accumulator chamber 3B; the lid 813 effectively sealing the chamber 3B, as best seen in FIG. 9. The mount 860 includes a raised, chamber ridge 862 on one surface 864 of the mount such that the surface 864 and ridge 862 partially forming a cavity 901, FIG. 9. In the preferred embodiment, the ridge 862 is circular; however, other shapes can be adapted to a particular pen implementation. As with the embodiments of FIGS. 2 through 6, an ink impermeable, flexible diaphragm 823 is used. The diaphragm 823 has its periphery secured to the rim 866 of the ridge 862 in a fluid-tight, sealing manner. Thus, one surface 1105, FIG. 11, of the diaphragm 823 forms an inner wall for the cavity 901 and essentially makes it fluid tight. That is, although the regulator mechanism on the mount 860 is submerged in ink when ink accumulator chamber 3B is filled, no ink will enter the cavity 901.

An air vent 819 (FIGS. 8 and 10A) via a channel 814 in the lid 813 is coupled through a hollow air standpipe 1111 (see also FIG. 11) to the diaphragm-sealed cavity 901 via an air inlet port 911 (FIGS. 9 and 10A). The cavity 901 is thus an air chamber maintained at local atmospheric pressure.

Figure 8:
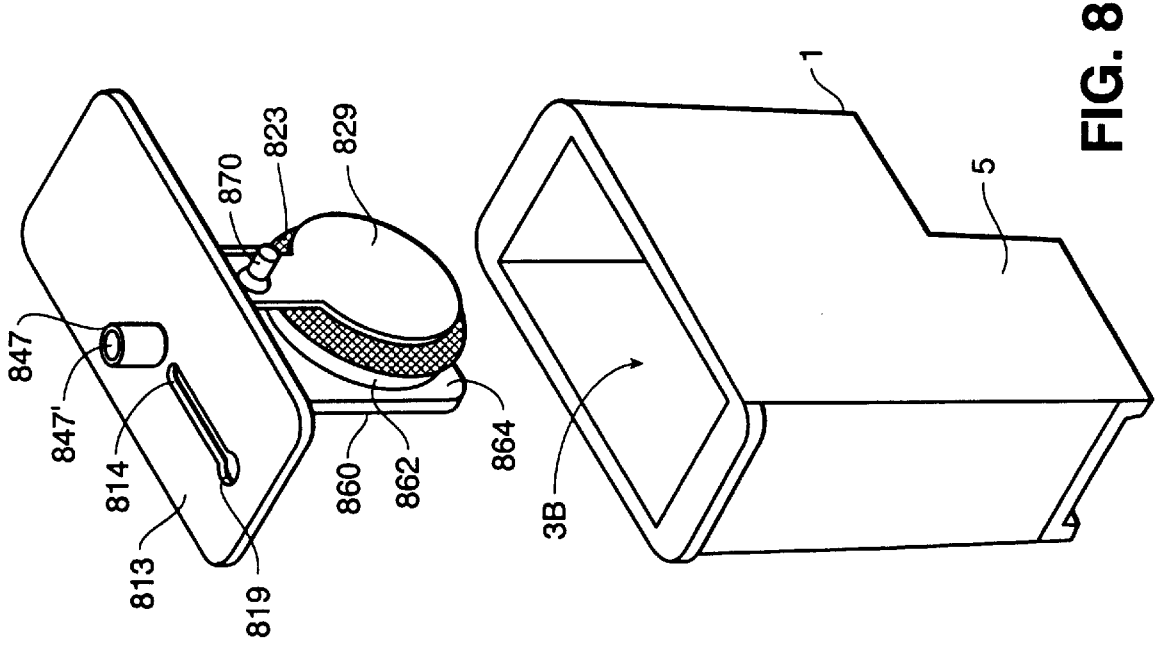
FIG. 8 is a partially exploded, perspective view of an alternative embodiment of an ink-jet back-pressure regulated printhead accumulator incorporating an air purge mechanism in accordance with the present invention.
Figure 11:
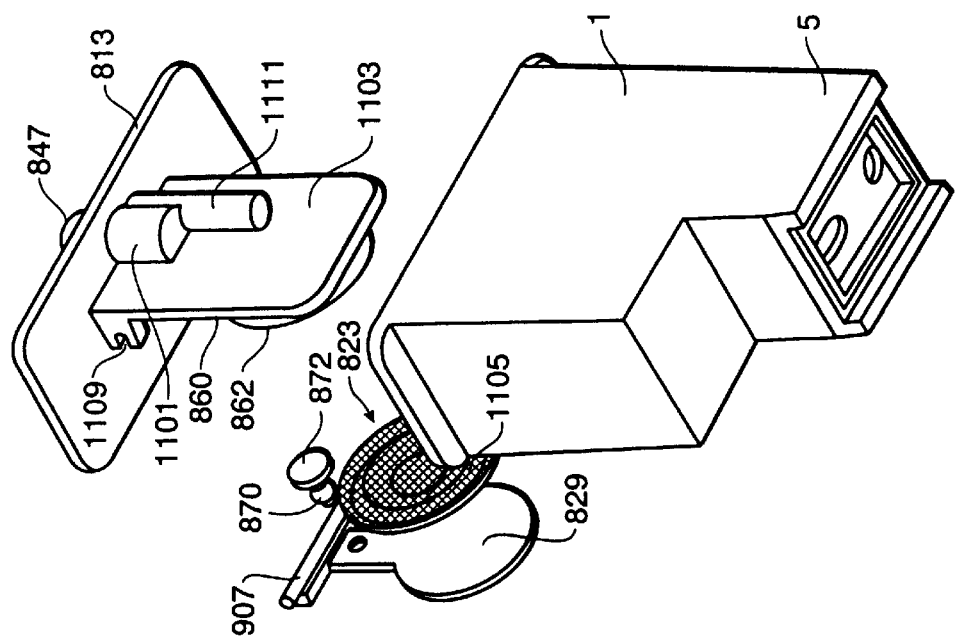
FIG. 11 is an exploded, perspective view of the present invention as shown in FIGS. 8 through 10A and 10B.

As shown in FIGS. 8 and 11, the lid 813 includes a ink supply port 847. The ink supply port 847 is adapted to be coupled to an off-axis ink supply (not shown) by a suitable conduit (not shown) such as an ink impervious plastic tube to complete a fluidic, or hydraulic, coupling. Alternatively, an on-axis, replaceable ink reservoir can be designed to snap onto the ink supply port 847 in a "piggy-back" fit as shown in FIGS. 13A, 13B, 14A, and 14B, which will be discussed further with respect to the methodology of the present invention hereinafter.

Figure 12:
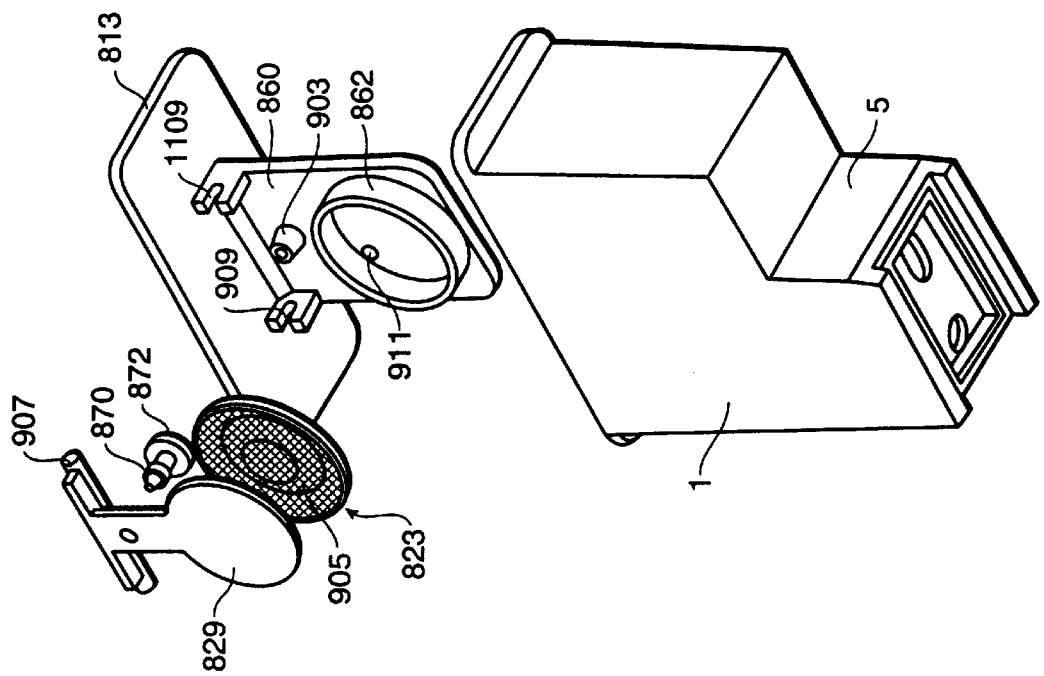
FIG. 12 is an exploded, perspective view from a different angle of the present invention as shown in FIG. 11.

A hollow ink standpipe 1101, FIG. 11, is on the opposing surface 1103 of the mount 860 as the raised chamber ridge 862. The standpipe 1101 fluidically couples the ink supply port 847 to a valved ink port 903 (FIGS. 9 and 12). Ink from the reservoir flows under pressure (atmospheric or higher) through the hollow bore 847' (FIGS. 8, 10A and 10B) of the ink supply port 847 and ink standpipe 1101 into ink accumulator chamber 3B. The opposing surface 905 (FIGS. 9 and 12) of the diaphragm 823 to that surface 1105 which forms an inner wall of cavity 901 is affixed to a plunger 829.

Plunger 829 includes a fixed crossbar axle 907 (FIGS. 9, 11, and 12) which is rotatably fit into support bearings 909, 1109 of the mount 860. A biasing mechanism (not shown) analogous to the springs 31, 231, 531, 631 used in the previous embodiments is used to set the appropriate back-pressure set point. A valve 870 which carries a valve seat 872 is affixed to the plunger 829 such that the valve seat 872 mates with the ink port 903 when the diaphragm 823 is at its biased position to the predetermined back-pressure set point and the ink accumulator chamber 3B is substantially full (as is explained in detail with respect to previous embodiments). Thus, ink is not flowing from the off-axis supply, through the supply port 847 and the ink port 903 into ink accumulator chamber 3B until an atmospheric pressure to back-pressure imbalance occurs. That is, as with previous embodiments, when atmospheric pressure flexes the diaphragm 823 outwardly from the cavity 901 due to a pressure imbalance as in the accumulator chamber 3B is depleted, the plunger 829 swings on its axle 907, and the valve seat 872 is pulled away from the ink port 903, refilling the ink accumulator chamber 3B.

Figure 13B:
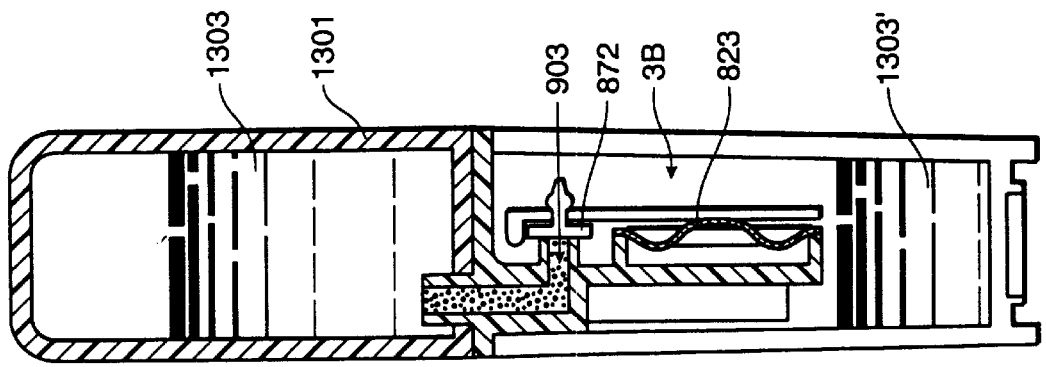
FIGS. 13A and 13B are another depiction of the present invention as shown in FIGS. 8 through 12 in which a before purging condition in accordance the present invention is demonstrated.
Figure 13A:
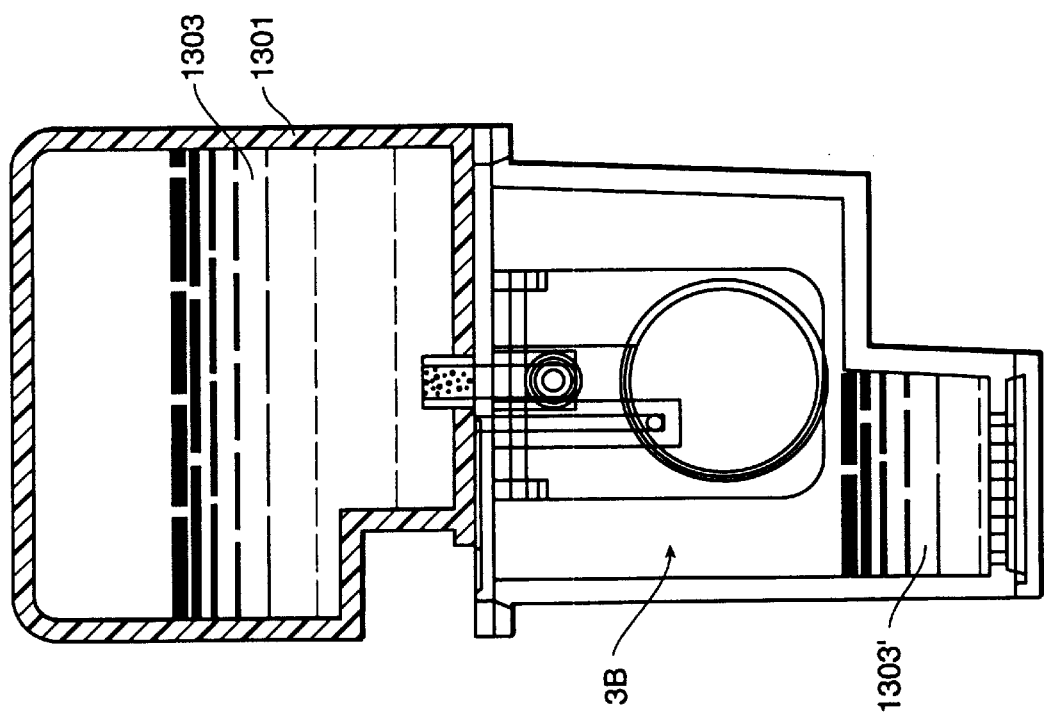

Air purging of the ink accumulator chamber 3B is accomplished in the following manner. FIGS. 13A and 13B depict a free-ink ink-jet pen embodiment as shown in FIGS. 8–12 onto which a piggy-back ink supply 1301, such as a disposable, replaceable ink-filled cartridge, has been fitted to supply port 847. In the condition shown, namely before purging, the ink supply 1301 has a partial volume of ink 1303 contained therein. The ink accumulator chamber 3B has a partial volume of ink 1303' shown in the snout portion 5 and air, or other gases, in the rest of the chamber 3B. As best seen in FIG. 13B, the regulator mechanism shows the diaphragm 823 at its unflexed position. Valve seat 872 is mated against the ink port 903. In order to fill the ink accumulator chamber 3B, the air therein must be purged.

Turning now to FIGS. 14A and 14B, any suitable mechanism 1401 for providing a positive pressure greater than atmospheric pressure is brought into contact with the apparatus of the present invention such that the positive pressure is applied to the vent 819 in the lid 813. Such pressure can be applied such as by a simple pump (not shown) incorporated into a service station mechanism of the hard copy apparatus in which the pen is used; preferable the operation is automated to make the purging process "invisible" to the end user. The positive air pressure will drive the diaphragm 823 outwardly from the cavity 901 as shown in FIG. 14B. Via the plunger 829, this opens the ink port 903. As the pressure increases, bubbles are now forced out of the ink accumulator chamber 3B through the ink port 903 an into the ink supply 1301 where they will not affect printhead performance. Note that an equivalent, fully mechanical mechanism can be designed and substituted for the positive air pressure mechanism used to force the diaphragm 823 to open the ink port 903.

After purging, the positive pressure is removed. Then, in accordance with the normal regulator operation described above, ink 1303 flows from the supply 1301 into the ink accumulator chamber 3B due to the pressure differential. Since bubbles and vapor-saturated ink will be the "lightest", bubbles and vapor-saturated ink are forced out first by this method.

It has been found that, depending on the exact pen design, a pressure in the range from atmospheric +3 inches of water to +60 inches of water will be sufficient to remove the bubbles from the ink accumulator chamber 3B. Greater pressure will cause excessive drooling through the nozzle plate 6 and may cause the diaphragm to burst of become permanently deformed, thus hindering the operation of the regulator mechanism. As positive pressures will cause undesirable drooling through the nozzle plate, although a "perfect" pressure may be determined for any particular design in which purging is accomplished without simultaneous drooling, it is simpler to provide a printhead cap 1403 as part of the service station mechanism as would be well known in the art, thus preventing such adverse reactions.

Note that bubbles can also be flushed or purged in accordance with the present invention from either the ink supply reservoir (such as by using the invention as set forth in U.S. patent application Ser. No. 08/519384) or from any conduit between the pen and an off-axis ink supply reservoir (as taught in U.S. patent application Ser. No. 08/566644, filed on Dec. 4, 1995 by N. Pawlowski, Jr., assigned to the common assignee of the present invention, and incorporated herein by reference).

The foregoing description of the preferred and alternative embodiments of the present invention has been presented for purposes of illustration and description. It is not intended to be exhaustive or to limit the invention to the precise form disclosed. Obviously, many modifications and variations will be apparent to practitioners skilled in this art. Similarly, any process steps described might be interchangeable with other steps in order to achieve the same result. The embodiments were chosen and described in order to best explain the principles of the invention and its best mode practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. A method for purging bubbles from an ink-jet pen apparatus adapted for use with a separate ink reservoir coupled to supply ink from the ink reservoir to the ink-jet pen apparatus at a predetermined feed pressure, the method comprising the steps of:

providing an ink-jet pen body having an on-axis ink accumulator chamber, a thermal ink-jet print head mechanism hydraulically coupled to the chamber, and a regulating means, mounted within the chamber, for regulating flow of ink into the chamber from the ink reservoir and for maintaining a predetermined, substantially constant, back-pressure set point at the ink-jet print head;

coupling the ink containment chamber to the ink reservoir via the regulating means;

filling the ink containment chamber with ink from the ink reservoir via the regulating means; and after the step of filling the ink containment chamber, periodically forcing the regulating means to an open flow position and flushing bubbles in the ink accumulator chamber into the ink reservoir.

2. The method as set forth in claim 1, wherein the step of providing an ink-jet pen body further comprises the step of:

biasing the regulating means with a substantially constant bias force during varying ink flow rates from the ink reservoir into the ink accumulator chamber.

3. The method as set forth in claim 2, wherein the step of filling further comprises the step of:

opening and closing an ink inlet valve in response to a pressure differential between ambient atmospheric pressure and the predetermined back-pressure set point.

4. The method as set forth in claim 3, wherein the step of periodically forcing the regulating means to an open flow position and flushing bubbles in the ink accumulator chamber into the ink reservoir purging means comprises the step of:

introducing positive gaseous pressure into the regulating means, opening the ink inlet valve such that the bubbles flow out though the ink inlet valve.

5. The method as set forth in claim 4, wherein the step of introducing positive gaseous pressure further comprises the step of:

introducing a positive gaseous pressure greater than required to open the ink inlet valve and less than will cause damage to the regulating means or the print head mechanism.

6. The method as set forth in claim 5, wherein the step of introducing positive gaseous pressure further comprises the step of:

introducing a positive gaseous pressure in the range of atmospheric plus three inches of water to atmospheric plus 60 inches of water.

7. The method as set forth in claim 1, wherein prior to the step of forcing the regulating means to an open flow position and flushing bubbles in the ink accumulator chamber into the ink reservoir, the method includes the step of:

capping the print head mechanism.

8. The method as set forth in claim 7, wherein the print head mechanism includes a plurality of nozzles, the step of forcing the regulating means to an open flow position and flushing bubbles in the ink accumulator chamber into the ink reservoir further comprises the step of:

causing inclusions of bubbles to be removed from the print head mechanism through the nozzles when the print head mechanism is uncapped.

9. An ink-jet pen device for a hard copy apparatus including an ink reservoir means for providing ink under pressure to the pen device via a hydraulic coupling and a means for delivering print media to the pen device, the ink-jet pen device comprising:

thermal print head means for transferring droplets of ink to the print media during printing operation of the hard copy apparatus;

ink containing means, having the print head means mounted thereon, for containing an on-board supply of ink for the print head means such that the print head means has a predetermined on-board volume of ink available;

regulating means, enclosed within the ink containing means, for regulating flow of ink from the ink reservoir means into the ink containing means and for maintaining a predetermined, substantially constant, back-pressure at the print head means during varying ink flow rates from the ink reservoir means into the ink containing means; and purging means for forcing the regulating means to a position permitting flow of ink from the ink reservoir means into the ink containing means such that after the ink containing means is filled gaseous bubbles within the ink containing means are flushed from the on-board supply of ink via the hydraulic coupling.

10. The device as set forth in claim 9, wherein the regulating means further comprises:

valving means for controlling the flow of ink from the ink reservoir means into the ink containing means, biasing means, coupled to the valving means and having a substantially constant bias force, for opening and closing the valving means in response to a force due to a pressure differential between ambient atmospheric pressure and the substantially constant bias force, and the purging means provides a force greater than the bias force.

11. The device as set forth in claim 10, wherein the regulating means further comprises:

leverage means, coupled to the biasing means, having a valve seat located thereon to open and close the valving means.

12. The device as set forth in claim 11, wherein the purging means comprises:

a means for introducing forced air pressure into the device to activate the leverage means to open the valving means.

13. The device as set forth in claim 11, wherein the leverage means further comprises:

means for forcing the valving means open and allowing air to pass from the ink containing means into the ink reservoir means.

14. The device as set forth in claim 10, wherein the biasing means further comprises:

a torsion spring having at a first extremity extension member fixedly coupled to the regulating means, a free floating coil member within the ink containing means, and a second extremity fixedly coupled to the ink containing means.

15. The device as set forth in claim 10, wherein the regulating means further comprises:

a bag member, coupled to the leverage means and adapted to expand and contract in response to a pressure differential between ambient atmospheric pressure and the substantially constant bias force such that the valving means opens as ambient atmospheric pressure force exceeds the substantially constant bias force.

16. The device as set forth in claim 10, wherein the regulating means further comprises:

a diaphragm member, coupled to the leverage means and adapted to expand and contract in response to a pressure differential between ambient atmospheric pressure force on the diaphragm member and the substantially constant bias force such that the valving means opens as ambient atmospheric pressure force exceeds the substantially constant bias force.

17. The device as set forth in claim 16, wherein the diaphragm member further comprises:

a flexible diaphragm having an area of a shape and dimensions such that the area in communication with ambient atmospheric pressure is maximized for a given ink containing means.

18. The device as set forth in claim 16, further comprising:

venting means through the ink containment means such that the diaphragm member can be flexed to exert a positive pressure within the ink containment means such that bubbles and vapor-saturated ink within the ink containment chamber is forced through the valving means.

19. A free-ink ink-jet pen fluidically coupled to a separate ink reservoir, comprising:

a pen body having a fluid tight ink containment chamber with an inlet port having a fluidic coupling for receiving ink from the separate ink reservoir and a diaphragm aperture;

a thermal ink-jet print head coupled to the pen body such that ink in the ink containment chamber is supplied to the print head mechanism at a predetermined back-pressure set point;

a regulator mechanism including a flexible, ink impermeable, diaphragm mounted in an aperture of the pen body having a first surface within the ink containment chamber and a second surface in communication with ambient atmosphere, a plunger coupled to the first surface of the diaphragm, a valve seat coupled to the plunger adjacent the inlet port such that ink flow from the remote reservoir is valved by variably moving the valve seat onto and off of the inlet port, a biasing mechanism coupled to the plunger and exerting a near linear force on the plunger such that the diaphragm is balanced against a force exerted on the second surface by the ambient atmosphere at the predetermined back-pressure set point at the print head regardless of the rate of flow of ink through the valve when the valve seat is moved off of the inlet port due to a force exerted by a differential between ambient atmospheric pressure and the back-pressure; and a vent to ambient atmosphere through the pen body, establishing ambient atmospheric pressure on the second surface of the diaphragm and providing a means for selectively establishing a positive pressure against the second surface of the diaphragm such that the valve seat is moved off of the inlet port after the ink containment chamber is filled, such that the positive pressure flushes gas bubbles from the ink containment chamber via the fluidic coupling.

20. The pen as set forth in claim 19, comprising:

the separate ink reservoir is a replaceable ink cartridge adapted to be attached to the inlet port.

* * * * *